United States Patent
Liu

(10) Patent No.: US 7,230,797 B1
(45) Date of Patent: Jun. 12, 2007

(54) SLIDER HAVING TRANSVERSELY SEPARATED BEARING SURFACES AND OPENINGS TO REAR BEARING SURFACES

(75) Inventor: Hain-Ling Liu, Northborough, MA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 11/241,440

(22) Filed: Sep. 29, 2005

Related U.S. Application Data

(60) Provisional application No. 60/617,154, filed on Oct. 8, 2004.

(51) Int. Cl.
G11B 15/64 (2006.01)
(52) U.S. Cl. .................................. 360/235.8
(58) Field of Classification Search ............ 360/235.8, 360/235.5, 236.1, 236.2, 236.5, 236.6, 235.7, 360/236.3, 237
See application file for complete search history.

(56) References Cited

U.S. PATENT DOCUMENTS

| | | | | |
|---|---|---|---|---|
| 5,309,303 | A * | 5/1994 | Hsia et al. ................ | 360/236.1 |
| 5,721,650 | A * | 2/1998 | Crane et al. ............. | 360/236.3 |
| 6,560,071 | B2 | 5/2003 | Chapin et al. | |
| 6,678,119 | B1 * | 1/2004 | Pendray et al. .......... | 360/236.6 |

(Continued)

OTHER PUBLICATIONS

Five pages that illustrate (i) on p. 1 a slider by Seagate Technology LLC (Slider by Seagate), a slider by Maxtor Corporation (Slider #1 by Maxtor), and a second slider by Maxtor Corporation (Slider #2 by Maxtor), (ii) on p. 2, simulated mass flow for the Slider by Seagate, Slider #1 by Maxtor, and Slider #2 by Maxtor, (iii) on p. 3, simulated air bearing pressure for the Slider by Seagate, Slider #1 by Maxtor, and Slider #2 by Maxtor, (iv) on p. 4, modeled CSS landings/takeoff analysis for the Seagate slider, Slider #1 by Maxtor, and Slider #2 by Maxtor, and (v) on p. 5, altitude sensitivity for the Slider by Seagate, Slider #1 by Maxtor, and Slider #2 by Maxtor. It is believed that the Slider by Seagate and slider #2, by Maxtor was on sale or was in public use more than one year prior to the Oct. 8, 2004 priority date of the present invention. It is also believed that slider #1 by Maxtor was in public use in Jul. 2004.

(Continued)

Primary Examiner—Tianjie Chen
(74) Attorney, Agent, or Firm—James P. Broder; Steven G. Roeder

(57) ABSTRACT

A disk drive for storing data includes a rotating storage disk and a slider positioned near the storage disk. The slider has a flying side and a read/write head. The flying side has (i) a leading edge, (ii) a trailing edge that is opposite the leading edge, (iii) first lateral edge, and (v) a second lateral edge that is opposite the first lateral edge. The flying side includes a leading bearing surface, an intermediate bearing surface, and a transverse channel positioned between the bearing surfaces. The transverse channel extends between the lateral edges to direct fluid flow to the lateral edges. Additionally, the flying side includes a first rear bearing surface, a second rear bearing surface, and a center rear bearing surface. Moreover, the flying side includes a first opening, a second opening and a center opening in the intermediate bearing surface. The openings allow for the flow of fluid to the rear bearing surfaces.

37 Claims, 4 Drawing Sheets

U.S. PATENT DOCUMENTS

| | | | | |
|---|---|---|---|---|
| 6,744,599 | B1* | 6/2004 | Peng et al. | 360/236.2 |
| 6,980,399 | B2* | 12/2005 | Rajakumar et al. | 360/235.5 |
| 6,989,967 | B2* | 1/2006 | Pendray et al. | 360/236.5 |
| 6,999,282 | B2* | 2/2006 | Rao | 360/236 |
| 7,106,556 | B2* | 9/2006 | Pendray et al. | 360/235.8 |
| 2003/0058578 | A1* | 3/2003 | Boutaghou et al. | 360/235.8 |
| 2004/0201923 | A1* | 10/2004 | Rao et al. | 360/235.7 |

OTHER PUBLICATIONS

On p. 1, each slider includes (i) one or more air bearing surfaces (gray background with "/" surface background), (ii) one or more surfaces that are at a step down depth ( white background with "X" surface background), and (iii) one or more surface that are at a cavity depth (ligher gray background).

* cited by examiner

SLIDER HAVING TRANSVERSELY SEPARATED BEARING SURFACES AND OPENINGS TO REAR BEARING SURFACES

RELATED APPLICATION

This application claims the benefit on U.S. Provisional Application Ser. No. 60/617,154 filed on Oct. 8, 2004. The contents of U.S. Provisional Application Ser. No. 60/617,154 are incorporated herein by reference.

BACKGROUND

Disk drives are widely used in computers, consumer electronics and data processing systems for storing information in digital form. A disk drive typically includes one or more storage disks and one or more sliders. Each slider includes a read/write head that transfers information to and from the storage disk. Rotation of the storage disk causes the slider to ride on an air bearing so that the read/write head is at a distance from the storage disk that is commonly referred to as a "head-to-disk spacing" or "fly height".

A number of factors can influence the fly height of a slider. For example, altitude can influence the fly height of certain sliders. Further, during a write operation, current flow in the write element of the read/write head generates heat and a temperature increase in and around the read/write head. This temperature increase causes thermal expansion of a portion of the slider toward the storage disk, known as "pole tip protrusion" or PTP. If the pole tip protrusion is too extensive, the slider can unintentionally contact the storage disk, causing off-track writing, damage to the slider, damage to the storage disk and/or a permanent loss of data.

Many attempts have been made to design a slider having certain specific desirable characteristics during operation of the disk drive. These desirable characteristics for a slider include: (i) no significant fly height loss due to altitude changes; (ii) quick takeoffs from a landed position on the storage disk; (iii) relative fly height insensitivity to pole tip protrusion; and (iv) self-cleaning flow field to avoid contamination build-up of read/write head.

Previous attempts to provide these varied characteristics have accomplished strong results in some areas, but mixed results across all characteristics.

SUMMARY

The present invention is directed to a disk drive having a rotating storage disk and a slider positioned near the storage disk. The slider includes a flying side that faces the storage disk and a read/write head that interacts with the storage disk to transfer information between the read/write head and the storage disk. The flying side includes a leading edge, a trailing edge that is opposite the leading edge, a first lateral side, and a second lateral side that is opposite the first lateral side.

In one embodiment, the flying side also includes a leading bearing surface, an intermediate bearing surface, and a transverse channel positioned between the leading bearing surface and the intermediate bearing surface. In this embodiment, the transverse channel extends all the way to the first lateral edge. With this design, at least a portion of the fluid flow in the transverse channel is directed to the first lateral edge. Additionally, the transverse channel can extend all of the way to the second lateral edge. With this design, at least a portion of the fluid flow in the transverse channel is also directed to the second lateral edge.

The flying side can also include a first rear bearing surface, a second rear bearing surface and a center rear bearing surface positioned between the first rear bearing surface and the second rear bearing surface. In one embodiment, the flying side includes (i) a first opening recessed surface in the intermediate bearing surface that allows a portion of the fluid flow in the transverse channel to be directed to the first rear bearing surface, (ii) a second opening recessed surface in the intermediate bearing surface that allows a portion of the fluid flow in the transverse channel to be directed to the second rear bearing surface, and (iii) a center opening recessed surface in the intermediate bearing surface that allows a portion of the fluid flow in the transverse channel to be directed to the center rear bearing surface.

In one design, the first opening recessed surface and/or the second opening recessed surface is at a different depth than the center opening recessed surface. For example, the first opening recessed surface and the second opening recessed surface can be at a step depth, and the center opening recessed surface can be at a cavity depth.

Additionally, in one embodiment, the flying side includes (i) a pair of spaced apart first side rails that extend between the first rear bearing surface and the intermediate bearing surface, the first side rails guiding at least a portion of the fluid flow to the first rear bearing surface, (ii) a pair of spaced apart second side rails that extend between the second rear bearing surface and the intermediate bearing surface, the second side rails guiding at least a portion of the fluid flow to the second rear bearing surface, and (iii) a pair of spaced apart center side rails that extend between the center rear bearing surface and the intermediate bearing surface, the center side rails guiding at least a portion of the fluid flow to the center rear bearing surface.

Moreover, a front of the leading bearing surface can include a pair of opposed tapered edges. Additionally, the leading bearing surface can include a groove that is located in a center of the leading bearing surface.

In certain embodiments, as a result of the surface features in the flying side, the slider has no significant fly height loss with altitude changes, the slider quickly takes off from a start-up position on the storage disk, the slider has relatively high pressure near the read-write head for pole tip protrusion fly height insensitivity and better dynamic performance, and/or the slider has a self cleaning flow field to inhibit contamination build-up near the read/write head.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
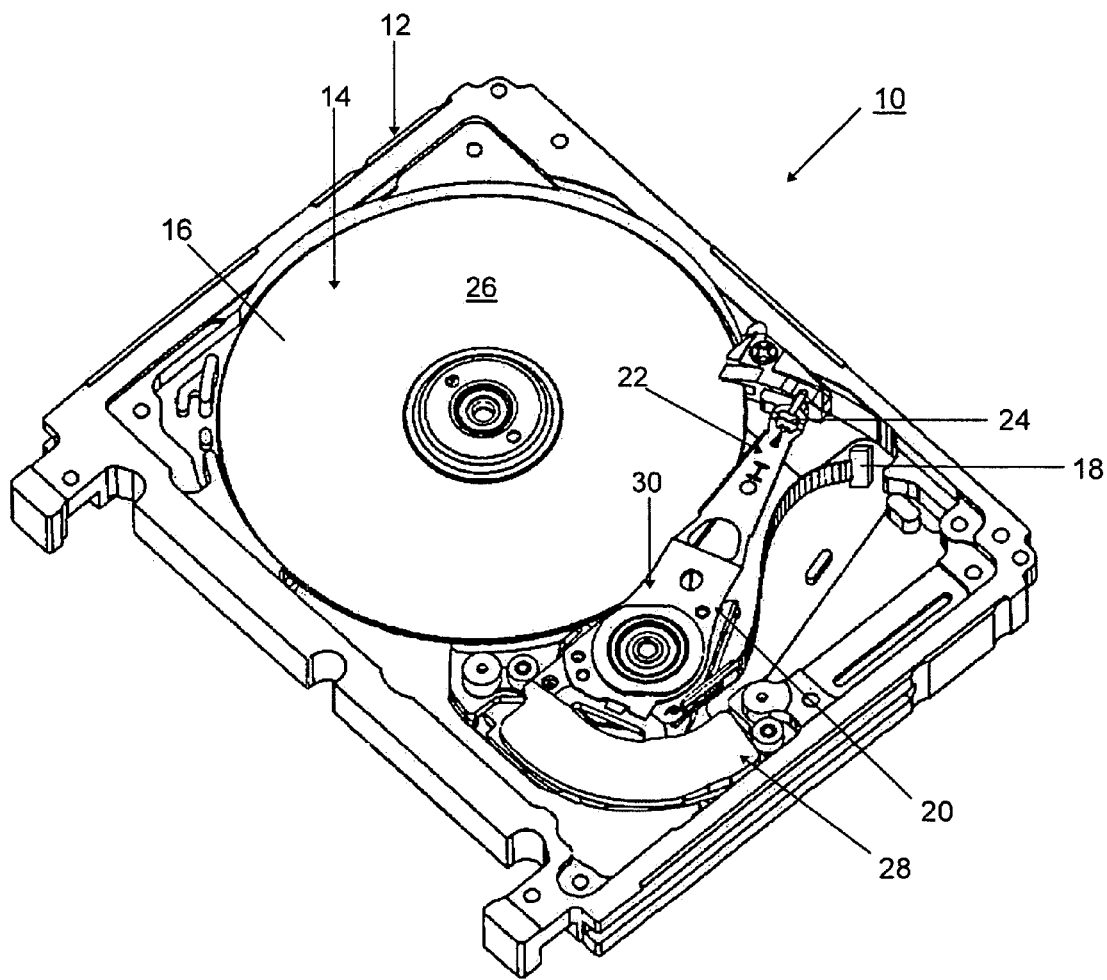
FIG. 1 is a perspective view of a disk drive having features of the present invention.

FIG. 1 illustrates a simplified perspective view of a disk drive 10 that includes (i) a drive housing 12, (ii) a disk assembly 14 having one or more storage disks 16 that rotate about an axis of rotation, (iii) a drive circuitry 18, and (iv) a head stack assembly 20 including one or more head suspension assemblies 22, with each head suspension assembly 22 including a slider 24.

Each storage disk 16 includes one or more disk surfaces 26 that each has a plurality of concentric data tracks (not shown) that store data. Rotation of the storage disk 16 generates fluid flow near the disk 16.

The drive circuitry 18 sends and/or receives electrical current from the slider 24 during read and/or write operations of the disk drive 10. The drive circuitry 18 can include a processor and one or more preamplifiers.

The head stack assembly 20 illustrated in FIG. 1 includes an actuator motor 28, one actuator arm 30, and one head suspension assembly 22. The head suspension assembly 22 is secured to the actuator arm 30, and supports the slider 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

The slider 24 transfers information between the drive circuitry 18 and the storage disk 16. During rotation of the storage disk 16, the storage disk 16 drags air under the slider 24. The air passing under the slider 24 creates a hydrodynamic lifting force that causes the slider 24 to fly above and in close proximity to the storage disk 16.

Figure 2:
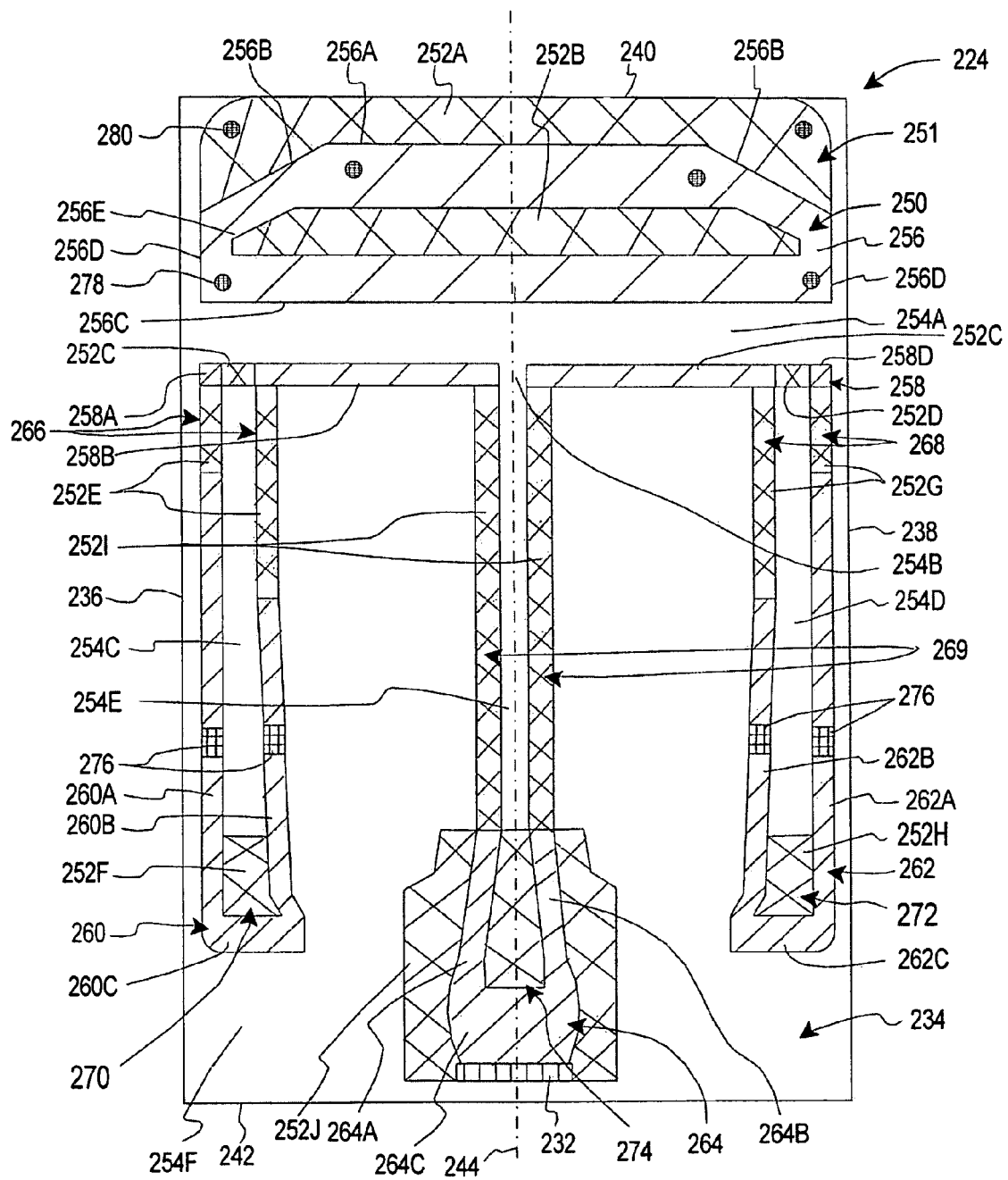
FIG. 2 is a top plan view of a slider having features of the present invention.

FIG. 2 is a simplified, bottom view of one embodiment of the slider 224 as viewed from the disk surface. The design and configuration of the slider 224 can be varied depending upon the requirements of the disk drive 10.

In one embodiment, the slider 224 is generally rectangular shaped and includes (i) a flying side 234 that faces the storage disk, (ii) an opposed backside (not shown), (iii) an ID lateral side that faces the axis of rotation of the storage disk 16, (iv) an OD lateral side that is opposite the ID lateral side, (v) a leading side, (vii) a trailing side that is opposite the leading side, and (viii) a read/write head 232 (illustrated as a box with "I" cross-hatching) that transfers data to or from the storage disk. The flying side 234 includes a first lateral edge 236, a second lateral edge 238 that is opposite the first lateral edge 236, a leading edge 240, and a trailing edge 242 that is opposite the leading edge 240. A longitudinal axis 244 of the slider 224 is illustrated for reference.

The composition and size of the slider 224 can vary. In one embodiment, portions of the slider 224 can be formed from materials such as alumina titanium carbide ceramic, for example. In alternative, non-exclusive examples, the length of the slider 224 (distance between leading edge and trailing edge) can be approximately 1, 1.1, 1.2, 1.24, 1.26, 1.3, or 1.4 millimeters (mm), and the width of the slider 224 (distance between the lateral edges) can be approximately 0.8, 0.9, 0.94, 0.96, 0.98, or 1 millimeters (mm). However, other larger and smaller slider 224 sizes can also be used with the present invention.

The read/write head 232 includes a write element (not shown) that writes data to the storage disk 16 during a write operation and a read element (not shown) that reads data from the storage disk 16 during a read operation. In FIG. 2, the read/write head 232 is located on the longitudinal axis 244 near the trailing edge 242. Alternatively, the read/write head 232 can be positioned at other locations on the slider 224. For example, the read/write head 232 can be located on either side of the longitudinal axis 244.

It should be noted that slider 224 typically flies at a positive pitch angle. With this design, when the read/write head 232 is positioned at or near trailing edge 242, the read/write head 232 is located near the closest point on the slider 224 to the disk.

As provided herein, the flying side 234 of the slider 224 includes one or more surface characteristics that uniquely cooperate so that the slider 224 has improved performance characteristics such as no significant fly height loss with altitude changes, relatively quick take offs and late touchdowns, relatively high pressure near the read-write head 256 for pole tip protrusion fly height insensitivity and better dynamic performance, and/or self cleaning flow field to inhibit contamination build-up. For example, the flying side 234 can include a plurality of bearing surfaces 250 (surfaces with "/" surface shading) that are defined and/or separated by one or more recessed surfaces 251 that are recessed below the bearing surfaces 250. In one embodiment, some of the recessed surfaces 251 are at a step down depth (surfaces with "X" surface shading), and some of the recessed surfaces 251 are at a cavity depth (surfaces without surface shading). Alternatively, the slider 224 can be designed so that the recessed surfaces 251 have more than two or less than two alternative depths.

In FIG. 2, different surface shadings indicate different surface depths. Moreover, areas on the slider 224 having the same surface shading have substantially similar depths.

In one embodiment, the flying side 234 includes a leading bearing surface 256, an intermediate bearing surface 258, a first rear bearing surface 260, a second rear bearing surface 262, and a center rear bearing surface 264.

In FIG. 2, the leading bearing surface 256 is located near and partly spaced apart from the leading edge 240. Further, the leading bearing surface 256 extends transversely to the longitudinal axis 244. The leading bearing surface 256 includes (i) a front 256A that has opposed tapered edges 256B, (ii) a rear 256C that extends transversely to the longitudinal axis 244, (iii) a pair of opposed sides 256D that are parallel to and spaced apart from the transverse edges 236, 238, and (iv) a groove 256E that is somewhat centrally located within the leading bearing surface 256.

The size of the groove 256E can be varied to achieve the desired flying and stiction characteristics of the slider 224. In alternative, non-exclusive embodiments, the area of the groove 256E is at least approximately 10, 20, 30, or 40 percent of the area of the rest of the leading bearing surface 256.

In FIG. 2, a leading recessed surface 252A is positioned between the leading edge 240 and the leading bearing surface 256. Further, the groove 256E is defined by a groove recessed surface 252B. In FIG. 2, the leading recessed surface 252A and the groove recessed surface 252B are at the step down depth. Alternatively, for example, the leading recessed surface 252A and/or the groove recessed surface 252B can be at the cavity depth.

The intermediate bearing surface 258 is generally rectangular shaped and extends transversely to the longitudinal axis 244 substantially parallel and spaced apart from the rear 256C of the leading bearing surface 256. Further, a transversely extending channel recessed surface 254A separates the intermediate bearing surface 258 from the leading bearing surface 256. In this embodiment, the transverse channel 254A extends completely between the lateral edges 236, 238. With this design, the open ended transverse channel 254A completely separates the intermediate bearing surface 258 and the other bearing surfaces 260, 262, 264 from the leading bearing surface 256.

In FIG. 2, the channel recessed surface 254A is at the cavity depth. Alternatively, in one embodiment, the channel recessed surface 254A can be at the stepped down depth.

In one embodiment, the intermediate bearing surface 258 is divided into (i) an ID segment 258A, (ii) a first center segment 258B, (iii) a second center segment 258C, and (iv) an OD segment 258D that are spaced apart and aligned transversely to the longitudinal axis 244. In FIG. 2, (i) a first opening recessed surface 252C separates the ID segment 258A and the first center segment 258B, (ii) a center opening recessed surface 254B separates the first center segment 258B and the second center segment 258C, and (iii) a second opening recessed surface 252D separates the OD segment 258D and the second center segment 258C.

In one embodiment, the first opening recessed surface 252C is aligned with the first rear bearing surface 260, the center opening recessed surface 254B is aligned with the center rear bearing surface 264, and the second opening recessed surface 252D is aligned with the second rear bearing surface 262.

In FIG. 2, the first opening recessed surface 252C and the second opening recessed surface 252D are at the step down depth and the center opening recessed surface 254B is at the cavity depth. Alternatively, for example, the first opening recessed surface 252C and/or the second opening recessed surface 252D can be at the cavity depth and/or the center opening recessed surface 254B can be at the step down depth.

The first rear bearing surface 260 is located near the first lateral side 236 and the trailing edge 242. In FIG. 2, the first rear bearing surface 260 is shaped somewhat similar to a "U" that is somewhat bulged towards the longitudinal axis 244. In this embodiment, the first rear bearing surface 260 includes a pair of spaced apart side sections 260A, 260B that extend generally parallel to the longitudinal axis 244 and a transverse section 260C that connects the side sections 260A, 260B.

In FIG. 2, a pair of spaced apart, side recessed surfaces 252E extend generally parallel to the longitudinal axis 244 and connect the side sections 260A, 260B to the intermediate bearing surface 258. Stated in another fashion, the side recessed surfaces 252E define a pair of spaced apart first side rails 266 that extend between the first rear bearing surface 260 and the intermediate bearing surface 258. In this embodiment, the first side rails 266 guide at least a portion of the fluid flow to the first rear bearing surface 260.

Additionally, a first feature recessed surface 252F is positioned directly before the transverse section 260C, and a first floor recessed surface 254C is positioned between the side recessed surfaces 252E and the first rear bearing surface 260.

With this design, the side recessed surfaces 252E and the first rear bearing surface 260 cooperate to form a generally enclosed first channel 270 with an enclosed depression (e.g. the first floor recessed surface 254C) and a convergent rail channel (e.g. the first feature recessed surface 252F).

In FIG. 2, the side recessed surfaces 252E and the first feature recessed surface 252F are at the step down depth, and the first floor recessed surface 254C is at the cavity depth.

The second rear bearing surface 262 is located near the second lateral side 238. In FIG. 2, the second rear bearing surface 262 is shaped somewhat similar to a "U" that is somewhat bulged towards the longitudinal axis 244. In this embodiment, the second rear bearing surface 262 includes a pair of spaced apart side sections 262A, 262B that extend generally parallel to the longitudinal axis 244 and a transverse section 262C that connects the side sections 262A, 262B.

In FIG. 2, a pair of spaced apart side recessed surfaces 252G extend generally parallel to the longitudinal axis 244 and connect the side sections 262A, 262B to the intermediate bearing surface 258. Stated in another fashion, the side recessed surfaces 252G define a pair of spaced apart second side rails 268 that extend between the second rear bearing surface 262 and the intermediate bearing surface 258. In this embodiment, the second side rails 268 guide at least a portion of the fluid flow to the second rear bearing surface 262.

Additionally, a second feature recessed surface 252H is positioned directly before the transverse section 262C, and a second floor recessed surface 254D is positioned between the side recessed surfaces 252G and the second rear bearing surface 262.

With this design, the side recessed surfaces 252G and the second rear bearing surface 262 cooperate to form a generally enclosed second channel 272 with an enclosed depression (e.g. the second floor recessed surface 254D) and a convergent rail channel (e.g. the second feature recessed surface 252H).

In FIG. 2, the side recessed surfaces 252G and the second feature recessed surface 252H are at the step down depth and the second floor recessed surface 254D is at the cavity depth.

The center rear bearing surface 264 is shaped somewhat similar to a "U" that is somewhat bulged outward at both sides at the bottom. In this embodiment, the center rear bearing surface 264 includes a pair of spaced apart side sections 264A, 264B that extend generally parallel to the longitudinal axis 244 and a transverse section 264C that connects the side sections 264A, 264B.

In FIG. 2, a pair of spaced apart side recessed surfaces 252I extend generally parallel to the longitudinal axis 244 and connect the side sections 264A, 264B to the intermediate bearing surface 258. Stated in another fashion, the side recessed surfaces 252I define a pair of spaced apart center side rails 269 that extend between the center rear bearing surface 264 and the intermediate bearing surface 258. In this embodiment, the center side rails 269 guide at least a portion of the fluid flow to the center rear bearing surface 264.

Additionally, a center feature recessed surface 252J surrounds the entire center rear bearing surface 264, and a center floor recessed surface 254E is positioned between the side recessed surfaces 252I and the center rear bearing surface 264.

With this design, the side recessed surfaces 252I and the center rear bearing surface 264 cooperate to form a generally enclosed center channel 274 with an enclosed depression (e.g. the center floor recessed surface 254E) and a convergent rail channel (e.g. the center feature recessed surface 252J).

In FIG. 2, the side recessed surfaces 252I and the center feature recessed surface 252J are at the step down depth and the center floor recessed surface 254E is at the cavity depth.

The read/write head 232 is positioned near the rear of the center rear bearing surface 264. Further, the rest of the slider 224 that surrounds the first rear bearing surface 260, the second rear bearing surface 262, and the center rear bearing surface 264 is at a remaining recessed depth 254F. In one embodiment, the remaining recessed depth 254F is at the cavity depth.

In FIG. 2, the center rear bearing surface 264 is located along the longitudinal axis 244, and the first rear bearing surface 260 and the second rear bearing surface 262 are situated symmetrical to the longitudinal axis 244. Alternatively, the center rear bearing surface 264 can be offset from the longitudinal axis 244 and/or the first rear bearing surface 260, and the second rear bearing surface 262 can be asymmetrical to the longitudinal axis 244.

In one embodiment, the center rear bearing surface 264 is closer to the trailing edge 242 than the first rear bearing surface 260, and the second rear bearing surface 262 to allow the slider 224 to roll about the longitudinal axis 244 while reducing the risk of contact between slider 224 and the storage disk 16. Further, with this design, the center rear bearing surface 264 remains the closest location on slider 224 to the disk 16 surface during flight at relatively large roll angles.

In one embodiment, the bearing surfaces 256, 258, 260, 262, 264 are substantially coplanar with one another. Alternatively, one or more of the bearing surfaces 256, 258, 260, 262, 264 or portions of the bearing surfaces 256, 258, 260, 262, 264 can be out-of-plane or tapered with respect to the other bearing surfaces 256, 258, 260, 262, 264.

Somewhat similarly, in one embodiment, the recessed surfaces 252A–252J at the step down depth are substantially coplanar with one another. Alternatively, one or more of these surfaces 252A–252J or portions of these surfaces 252A–252J can be out-of-plane or tapered with respect with the other recessed surfaces 252A–252J at the step down depth. In one embodiment, the step depth is approximately 0.1 to 0.3 µm (micrometers) when measured from the plane of the bearing surfaces 250. Alternatively, other step depths can be used.

Similarly, in one embodiment, the recessed surfaces 254A–254F at the cavity depth are substantially coplanar with one another. Alternatively, one or more of these surfaces 254A–254F or portions of these surfaces 254A–254F can be out-of-plane or tapered with respect to the other recessed surfaces 254A–254F at cavity depth. In one embodiment, the cavity depth is approximately 1 to 3 µm (micrometers) when measured from the plane of the bearing surfaces 250. Alternatively, other cavity depths can be used.

The bearing surfaces 250 and the recessed surfaces 251 can be defined during a fabrication of the slider 232 by photolithography processes, such as ion milling, chemical etching or reactive ion etching (RIE). The bearing surfaces 256, 258, 260, 264 can be formed by a lapping process.

In the embodiment illustrated in FIG. 2, the flying side 234 also includes (i) a rectangular shaped side cutout 276 (illustrated in checkered surface shading) in each of the side sections 260A, 260B, 262A, 262B of the first rear bearing surface 260 and the second rear bearing surface 262, (ii) four spaced apart, circular bearing cutouts 278 (illustrated in checkered surface shading) in the leading bearing 256 and (iii) two spaced apart, circular step cutouts 280 (illustrated in checkered surface shading) in the leading recessed surface 252A. In one embodiment, the cutouts 276, 278, 280 have a cutout depth of less than approximately 0.1 µm (micrometers) to larger than approximately 1 µm (micrometers) when measured from the plane of the bearing surfaces 250. Alternatively, other cutout depths can be used. The cutouts provide a suction pressure if they are behind the bearing surface and provide compression and more pressure on downstream bearing surfaces.

As stated above, the flying side 234 of the slider 224 includes surface characteristics that uniquely cooperate so that the slider 224 has improved performance characteristics such as no significant fly height loss with altitude changes, relatively quick take offs, relatively high pressure near the read-write head for pole tip protrusion fly height insensitivity and better dynamic performance, and/or self cleaning flow field to inhibit contamination build-up.

For example, the shaped front 256A of the leading bearing surface 256 and the leading step down surface 252A provide lift at a relatively low speed of rotation of the storage disk. As the storage disk rotates, air flow along the leading bearing surface 256 causes the leading bearing surface 256 to be lifted away from the storage disk. Accordingly, the lift provided at low speed of rotation of the storage disk enables improved pitch and takeoff performance of the slider 224. Further, the groove 256E in the leading bearing surface 256 and the leading step down surface 252A reduces the area of the flying side 234 in direct contact with the disk. This reduces the stiction and allows for relatively quick take offs. With the present design, a minimum fly-height is achieved at a lower RPM (during spin-up) than other slider designs. This results in less dragging and wearing on the slider.

Further, the transverse channel recessed surface 254A between the leading bearing surface 256 and the intermediate bearing surface 258 guides the bulk of the airflow to the lateral edges 236, 238 instead of the first rear bearing surface 250C, second rear bearing surface 262, and the center rear bearing surface 264. With this design, contaminates in the air by the slider 224 are moved to the lateral edges 236, 238 and a cleaner mass flow field flows over the center rear bearing surface 264 and the read/write head 232. Stated in another fashion, the airflow dynamics of the slider 232 provides a relatively clean particle flow field, which potentially minimizes particle contamination issues near the rear bearing surfaces 260, 262, 264.

Further, (i) the first opening recessed surface 252C allows a portion of the airflow to first channel 270 and the first rear bearing surface 260, (ii) the center opening recessed surface 254B allows a portion of the airflow to the center channel 274 and the center rear bearing surface 264, and (iii) the second opening recessed surface 252D allows a portion of the airflow to the second channel 272 and the second rear bearing surface 262.

In FIG. 2, the center opening 254B to the center channel 274 is deeper and larger than the first opening 252C to the first channel 270 and the second opening 254B to the second channel 272. With this design, the amount of air flow to the first rear bearing surface 260, the center rear bearing surface 264, and the second rear bearing surface 262 is controlled. Further, more air flows into the center channel 274 than into the first channel 270 and the second channel 272. As a result thereof, the center rear bearing surface 264 generates more lift than the first rear bearing surface 260 and the second rear bearing surface 262.

Moreover, each of the channels 270, 272, 274 include the enclosed depressions and convergent channel features that limit the reduction in pitch and roll stiffness and limit fly height sensitivity to changes in altitude. More specifically, each of the channels 270, 272, 274 is open to fluid flow and the trailing ends are closed to fluid flow. Once the fluid flow enters the respective channel 270, 272, 274, the flow is essentially bounded by the respective side rails 266, 268, 269 and directed at the respective rear bearing surface 260, 262, 264. This creates a relatively large pressure at each of the rear bearing surfaces 260, 262, 264.

Further, more air flows into the center channel 274 than into the first channel 270 and the second channel 272. With this design, a slider 224 has a very high pressure on the center rear bearing surface 264. As a result thereof, the position of the read/write head 232 is relatively stiff and PTP performance is good.

It should be noted that truncating the first and second rear bearing surfaces 260, 262 before the center rear bearing surface 264 reduces the amount of positive pressure developed along the lateral edges 236, 238. This reduces pitch and roll stiffness of the slider 224.

The altitude sensitivity of the slider 224 was computer simulated. More specifically, the fly height of the slider 224 was modeled at sea level and at 10,000 feet above sea level. It was determined that the slider 224 disclosed herein had a 0.08 nm increase in fly height at 10,000 feet above sea level (when compared to the fly height at sea level) when the slider 224 is positioned at the inner diameter of the storage disk and a 0.44 nm increase in fly height at 10,000 feet above sea level (when compared to the fly height at sea level) when the slider 224 is positioned at the outer diameter of the storage disk. Thus, with the design of the present slider 224, fly height was slight larger at 10,000 feet above sea level than it was at sea level. Stated in another fashion, the slider 224 provided herein effectively controls air flow in such a way that there is relatively little fly height sensitivity to changes in ambient pressure at altitudes between sea level and 10,000 feet above sea level. This allows the target fly height to be set for flying conditions at sea level and reduces the possibility of slider 224 crashes at higher operating altitudes.

Figure 3:
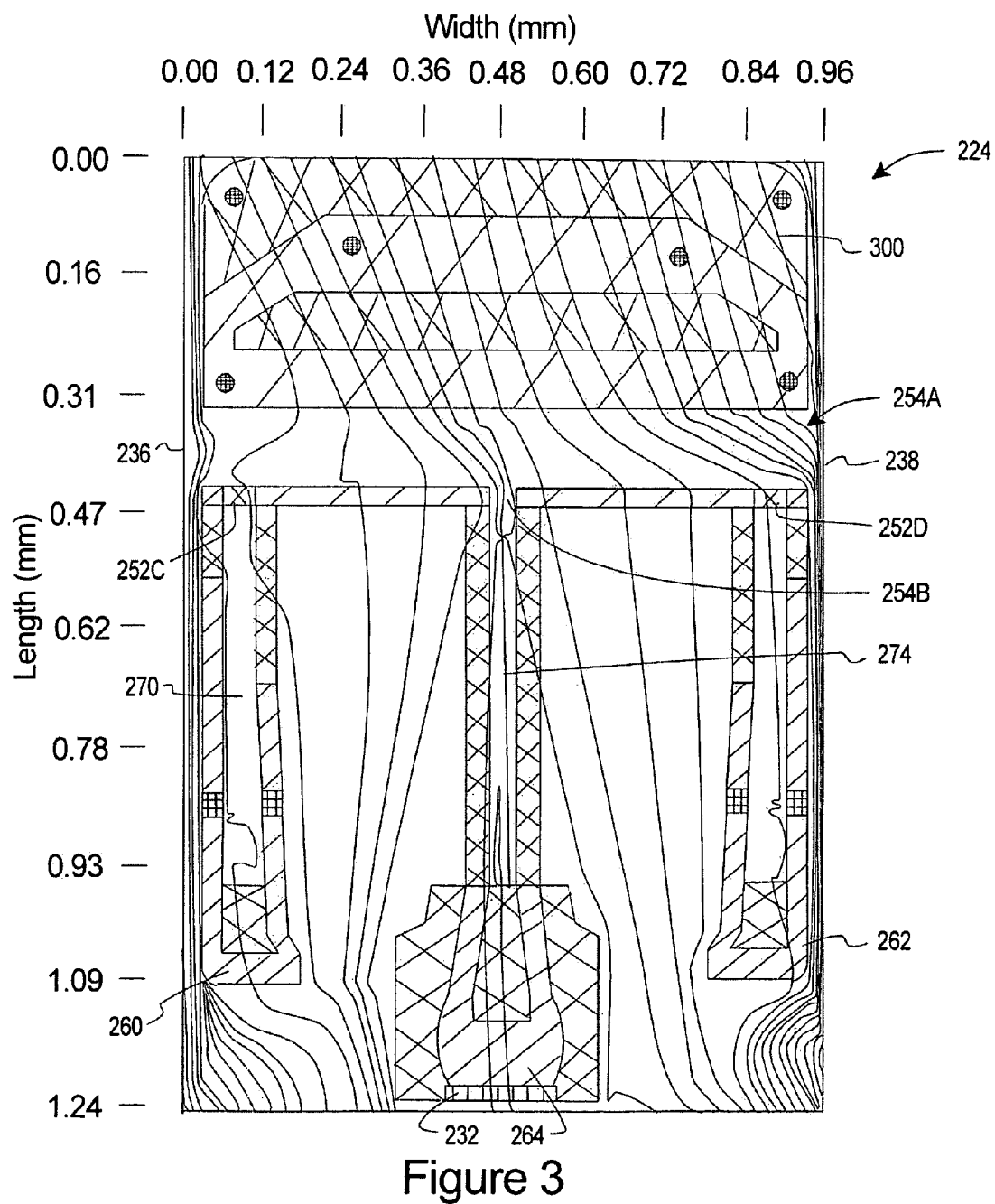
FIG. 3 is a top plan view of the slider of FIG. 2 illustrating mass flow of fluid across a flying side of the slider.

FIG. 3 is a top plan view of the slider of FIG. 2 illustrating mass flow 300 of fluid across the flying side of the slider 224 when the slider 224 is positioned near the inner diameter of the storage disk. The dimensions of one embodiment of the slider 224 are also included in FIG. 3.

FIG. 3 illustrates that the transverse channel recessed surface 254A guides the bulk of the airflow to the lateral edges 236, 238 instead of the first rear bearing surface 260, second rear bearing surface 262, and the center rear bearing surface 264. With this design, contaminates in the air by the slider 224 are moved to the lateral edges 236, 238 and a cleaner mass flow field flows over the center rear bearing surface 264 and the read/write head 232.

Further, (i) the first opening 252C allows a portion of the airflow to first channel 270 and the first rear bearing surface 260, (ii) the center opening 254B allows a portion of the airflow to the center channel 274 and the center rear bearing surface 264, and (iii) the second opening 252D allows a portion of the airflow to the second channel 272 and the second rear bearing surface 262. With this design, the amount of fluid flow into each of the channels 270, 272, 274 can be precisely controlled.

Figure 4:
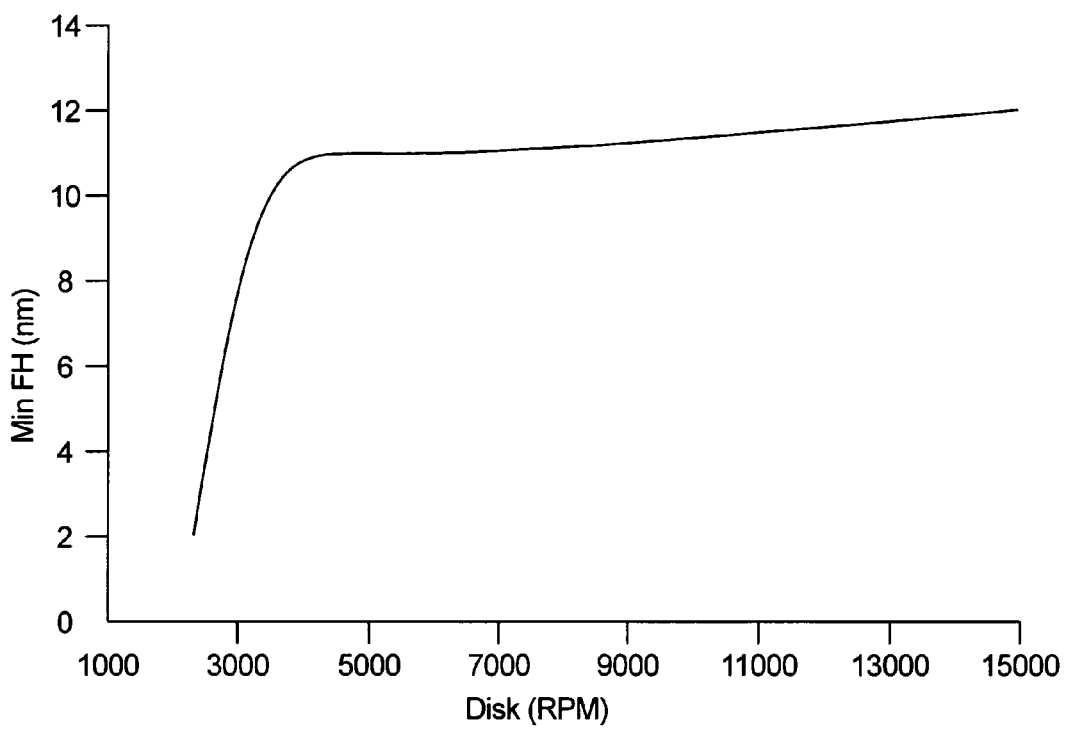
FIG. 4 is a graph that illustrates flying height of the slider at various disk rotation speeds.

FIG. 4 is a graph that illustrates flying height of the slider at various disk rotation speeds. FIG. 4 illustrates that the slider takes off and lands at a relatively low disk rotation rate and moves relatively quickly to near the maximum fly height. Further, the slider provides a relatively high rate of lift at a relatively low speed of rotation of the storage disk. With this design, the slider takes off relatively early and lands relatively late.

Figure 5:
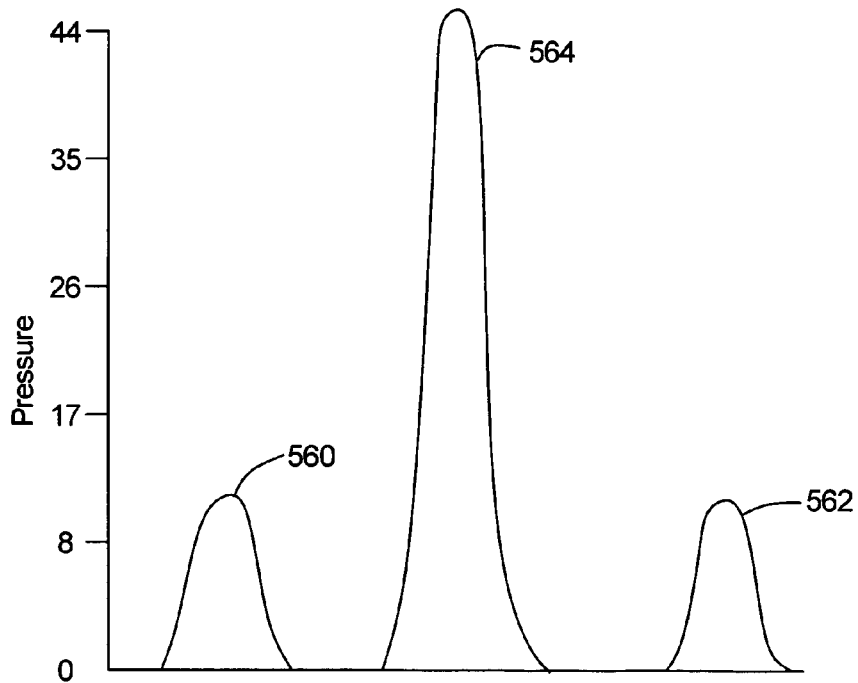
FIG. 5 is a graph that illustrates air bearing pressure on the slider.

FIG. 5 is a graph that illustrates air bearing pressure on the rear bearing surfaces of the slider when the slider is near the outer diameter of the storage disk. The portion of the curve designated 560 represents the pressure at the first rear bearing surface, the portion of the curve designated 562 represents the pressure at the second rear bearing surface, and the portion of the curve designated 564 represents the pressure at the center rear bearing surface. FIG. 5 illustrates that the slider has relatively high bearing pressure at the first rear bearing surface, the second rear bearing surface, and the center rear bearing surface. Further, the pressure at center rear bearing surface is greater than the pressure near the first rear bearing surface and the second rear bearing surface. In certain embodiments, the maximum pressure on the first and second rear bearing surfaces is approximately 10, 20, 25, 30, 40, 50 or 60 percent less than the maximum pressure on the center rear bearing surface.

While the particular slider 224 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including a leading edge, a trailing edge that is opposite the leading edge, a first lateral side, a second lateral side opposite the first lateral side, a first lateral edge positioned at an intersection of the first lateral side and the flying side, a second lateral edge positioned at an intersection of the second lateral side and the flying side, a leading bearing surface including a groove that is located in a center of the leading bearing surface, an intermediate bearing surface, and a transverse channel positioned between the leading bearing surface and the intermediate bearing surface, the transverse channel extending from the first lateral edge to the second lateral edge so that at least a portion of the fluid flow in the transverse channel is directed to one of the lateral edges.

2. The disk drive of claim 1 wherein at least a portion of the fluid flow in the transverse channel is directed to each of the lateral edges.

3. The disk drive of claim 1 wherein the transverse channel extends substantially perpendicularly to the lateral edges.

4. The disk drive of claim 1 wherein the flying side includes a leading recessed surface that is positioned between the leading edge and the leading bearing surface.

5. The disk drive of claim 1 wherein a front of the leading bearing surface includes a pair of opposed tapered edges.

6. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including a leading edge, a trailing edge that is opposite the leading edge, a first lateral side, a second lateral side opposite the first lateral side, a first lateral edge positioned at an intersection of the first lateral side and the flying side, a second lateral edge positioned at an intersection of the second lateral side and the flying side, a first rear bearing surface, a second rear bearing surface, and a center rear bearing surface that is positioned between the first rear bearing surface and the second rear bearing surface, a leading bearing surface, an intermediate bearing surface, a transverse channel positioned between the leading bearing surface and the intermediate bearing surface, the transverse channel extending from the first lateral edge to the second lateral edge so that at least a portion of the fluid flow in the transverse channel is directed to one of the lateral edges, a first opening in the intermediate bearing surface that allows a portion of the fluid flow in the transverse channel to be directed to the first rear bearing surface, a second opening in the intermediate bearing surface that allows a portion of the fluid flow in the transverse channel to be directed to the second rear bearing surface, and a center opening in the intermediate bearing surface that allows a portion of the fluid flow in the transverse channel to be directed to the center rear bearing surface.

7. The disk drive of claim 6 wherein the first opening and the second opening are at a step depth and the center opening is at a cavity depth that is greater than the step depth.

8. The disk drive of claim 6 wherein the first opening is at a different depth than the center opening.

9. The disk drive of claim 6 wherein the flying side includes (i) a pair of spaced-apart first side rails that extend between the first rear bearing surface and the intermediate bearing surface, the first side rails guiding at least a portion of the fluid flow to the first rear bearing surface, (ii) a pair of spaced-apart second side rails that extend between the second rear bearing surface and the intermediate bearing surface, the second side rails guiding at least a portion of the fluid flow to the second rear bearing surface, and (iii) a pair of spaced-apart center side rails that extend between the center rear bearing surface and the intermediate bearing surface, the center side rails guiding at least a portion of the fluid flow to the center rear bearing surface.

10. The disk drive of claim 6 wherein the flying side includes (i) a first channel positioned between the intermediate bearing surface and the first rear bearing surface, (ii) a second channel positioned between the intermediate bearing surface and the second rear bearing surface, and (iii) a center channel positioned between the intermediate bearing surface and the center rear bearing surface.

11. The disk drive of claim 10 wherein the first channel includes a first convergent channel feature, the second channel includes a second convergent channel feature, and the center channel includes a center convergent feature.

12. The disk drive of claim 11 wherein the flying side includes a leading recessed surface that is positioned between the leading edge and the leading bearing surface.

13. The disk drive of claim 12 wherein a front of the leading bearing surface includes a pair of opposed tapered edges.

14. The disk drive of claim 12 wherein the leading bearing surface includes a groove that is located near a center of the leading bearing surface.

15. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including (i) a trailing edge, (ii) a first lateral side, (iii) a second lateral side opposite the first lateral side, (iv) an intermediate bearing surface, (v) a center rear bearing surface that extends from the intermediate bearing surface towards the trailing edge, the center rear bearing surface being substantially centrally positioned between the lateral sides, (vi) a first opening in the intermediate bearing surface that allows a portion of the fluid flow to be directed to the first rear bearing surface, and (vii) a center opening in the intermediate bearing surface that allows a portion of the fluid flow in to be directed to the center rear bearing surface, wherein the first opening is at a different depth than the center opening.

16. The disk drive of claim 15 wherein the first opening and the second opening are at a step depth, and the center opening is at a cavity depth that is greater than the step depth.

17. The disk drive of claim 15 wherein the flying side includes (i) a pair of spaced apart first side rails that extend between the first rear bearing surface and the intermediate bearing surface, the first side rails guiding at least a portion of the fluid flow to the first rear bearing surface, (ii) a pair of spaced apart second side rails that extend between the second rear bearing surface and the intermediate bearing surface, the second side rails guiding at least a portion of the fluid flow to the second rear bearing surface, and (iii) a pair of spaced apart center side rails that extend between the center rear bearing surface and the intermediate bearing surface, the center side rails guiding at least a portion of the fluid flow to the center rear bearing surface.

18. The disk drive of claim 15 wherein the flying side includes (i) a first channel positioned between the intermediate bearing surface and the first rear bearing surface, (ii) a second channel positioned between the intermediate bearing surface and the second rear bearing surface, and (iii) a center channel positioned between the intermediate bearing surface and the center rear bearing surface.

19. The disk drive of claim 18 wherein the first channel includes a first convergent channel feature, the second channel includes a second convergent channel feature, and the center channel includes a center convergent feature.

20. The disk drive of claim 18 wherein the transverse channel extends all the way between the lateral edges so that at least a portion of the fluid flow in the transverse channel is directed to the lateral edges.

21. The disk drive of claim 20 wherein the transverse channel extends substantially perpendicularly to the lateral edges.

22. The disk drive of claim 15 wherein the flying side includes a leading edge, a trailing edge that is opposite the leading edge, a first lateral edge, a second lateral edge that is opposite the first lateral edge, a leading bearing surface and a transverse channel positioned between the leading bearing surface and the intermediate bearing surface.

23. The disk drive of claim 22 wherein the flying side includes a leading recessed surface that is positioned between the leading edge and the leading bearing surface.

24. The disk drive of claim 22 wherein a front of the leading bearing surface includes a pair of opposed tapered edges.

25. The disk drive of claim 22 wherein the leading bearing surface includes a groove that is located near a center of the leading bearing surface.

26. The disk drive of claim 22 wherein the flying side includes a leading recessed surface that is positioned between the leading edge and the leading bearing surface, wherein a front of the leading bearing surface includes a pair of opposed tapered edges, and wherein the leading bearing surface includes a groove that is located near a center of the leading bearing surface.

27. A disk drive comprising:
a rotating storage disk that generates fluid flow; and
a slider positioned near the storage disk, the slider including a flying side that faces the storage disk and a read/write head that interacts with the storage disk to transfer information between the storage disk and the read/write head, the flying side including (i) a leading edge, (ii) a trailing edge that is opposite the leading edge, (iii) a first lateral side, (iv) a second lateral side opposite the first lateral side, (v) a first lateral edge positioned at an intersection of the first lateral side and the flying side, (vi) a second lateral edge positioned at an intersection of the second lateral side and the flying side, (vii) a leading bearing surface, (viii) an intermediate bearing surface, (ix) a transverse channel positioned between the leading bearing surface and the intermediate bearing surface, the transverse channel extending from the first lateral edge to the second lateral edge so that at least a portion of the fluid flow in the transverse channel is directed to at least one of the lateral edges, (x) a first rear bearing surface positioned between the transverse channel and the trailing edge, (xi) a second rear bearing surface positioned between the transverse channel and the trailing edge, (xii) a center rear bearing surface that is positioned between the first rear bearing surface and the second rear bearing surface, (xiii) a first opening in the intermediate bearing surface that allows a portion of the fluid flow in the transverse channel to be directed to the first rear bearing surface, (xiv) a second opening in the intermediate bearing surface that allows a portion of the fluid flow in the transverse channel to be directed to the second rear bearing surface, and (xv) a center opening in the intermediate bearing surface that allows a portion of the fluid flow in the transverse channel to be directed to the center rear bearing surface, wherein the first opening and the second opening are at a step depth and the center opening is at a cavity depth that is greater than the step depth.

28. The disk drive of claim 27 wherein the transverse channel extends substantially perpendicularly to the lateral edges.

29. The disk drive of claim 27 wherein the flying side includes (i) a pair of spaced apart first side rails that extend between the first rear bearing surface and the intermediate bearing surface, the first side rails guiding at least a portion of the fluid flow to the first rear bearing surface, (ii) a pair of spaced apart second side rails that extend between the second rear bearing surface and the intermediate bearing surface, the second side rails guiding at least a portion of the fluid flow to the second rear bearing surface, and (iii) a pair of spaced apart center side rails that extend between the center rear bearing surface and the intermediate bearing surface, the center side rails guiding at least a portion of the fluid flow to the center rear bearing surface.

30. The disk drive of claim 27 wherein the flying side includes (i) a first channel positioned between the intermediate bearing surface and the first rear bearing surface, (ii) a second channel positioned between the intermediate bearing surface and the second rear bearing surface, and (iii) a center channel positioned between the intermediate bearing surface and the center rear bearing surface.

31. The disk drive of claim 30 wherein the first channel includes a first convergent channel feature, the second channel includes a second convergent channel feature, and the center channel includes a center convergent feature.

32. The disk drive of claim 27 wherein the flying side includes a leading recessed surface that is positioned between the leading edge and the leading bearing surface.

33. The disk drive of claim 27 wherein a front of the leading bearing surface includes a pair of opposed tapered edges.

34. The disk drive of claim 27 wherein the leading bearing surface includes a groove that is located near a center of the leading bearing surface.

35. The disk drive of claim 27 wherein the flying side includes a leading recessed surface that is positioned between the leading edge and the leading bearing surface.

36. The disk drive of claim 27 wherein a front of the leading bearing surface includes a pair of opposed tapered edges.

37. The disk drive of claim 36 wherein the leading bearing surface includes a groove that is located near a center of the leading bearing surface.

\* \* \* \* \*